March 6, 1928. 1,661,968
H. W. SANFORD
JOURNAL BOX AND AXLE
Filed Feb. 16, 1924 4 Sheets-Sheet 1
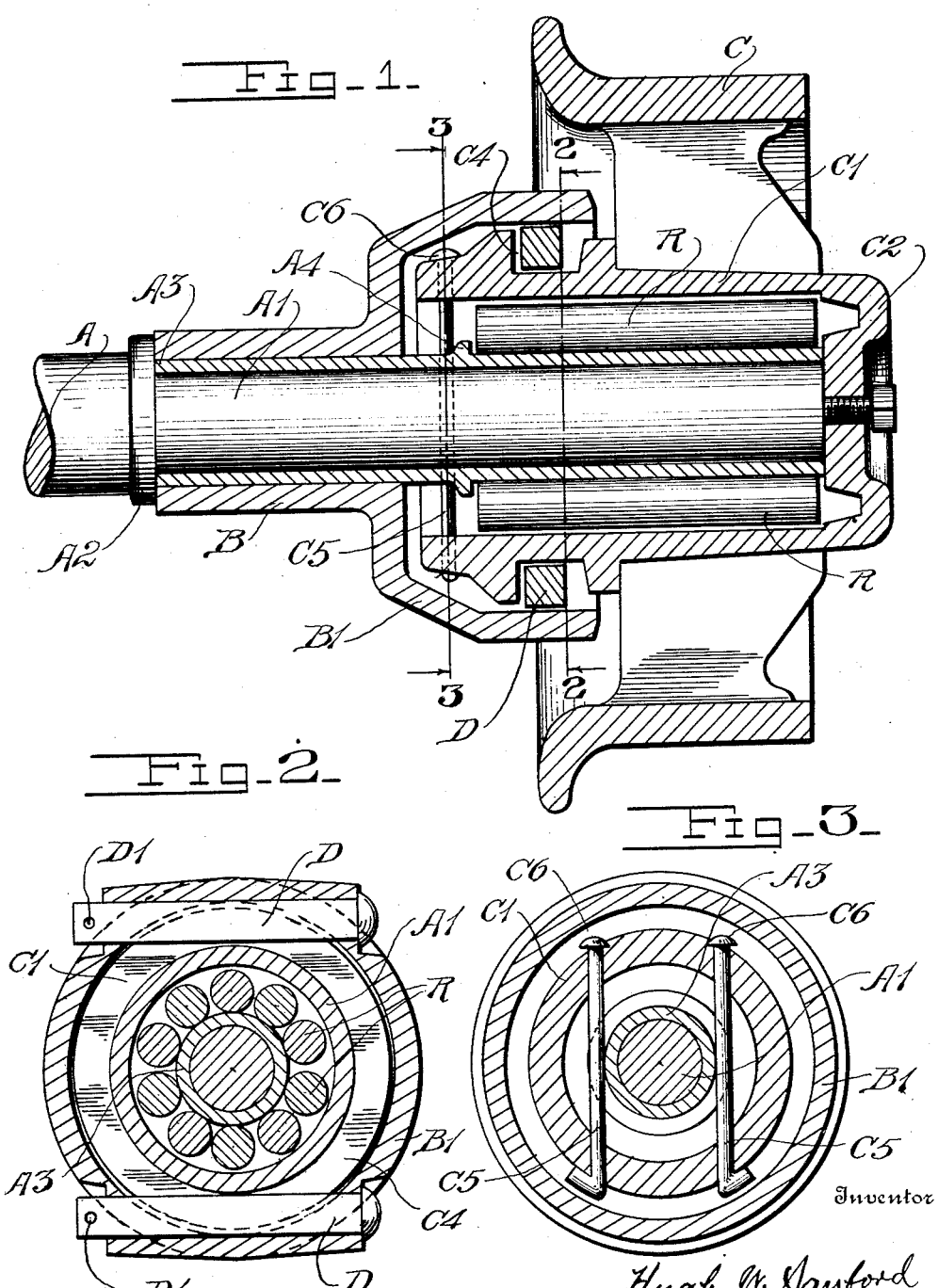

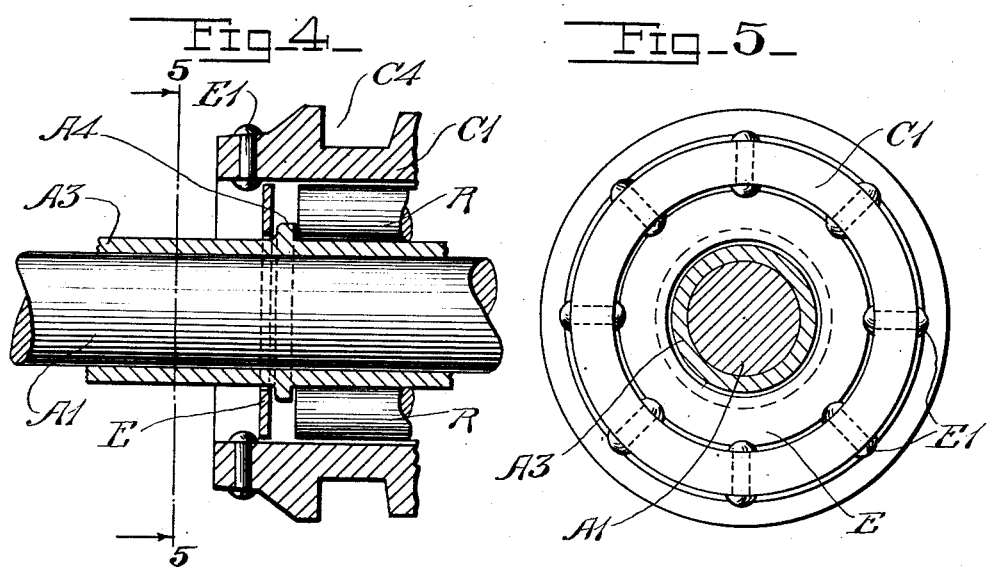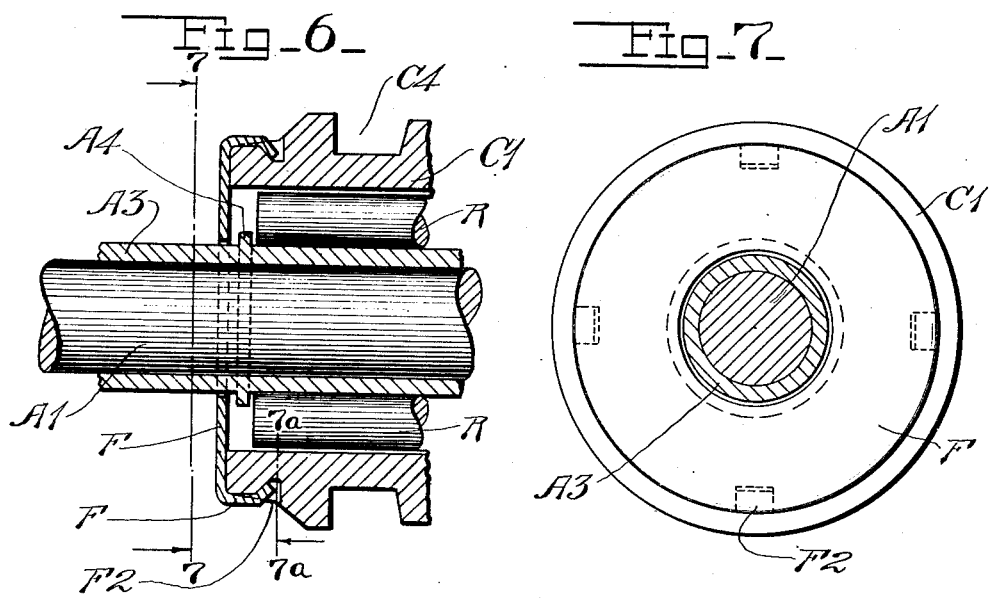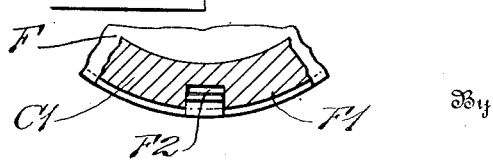

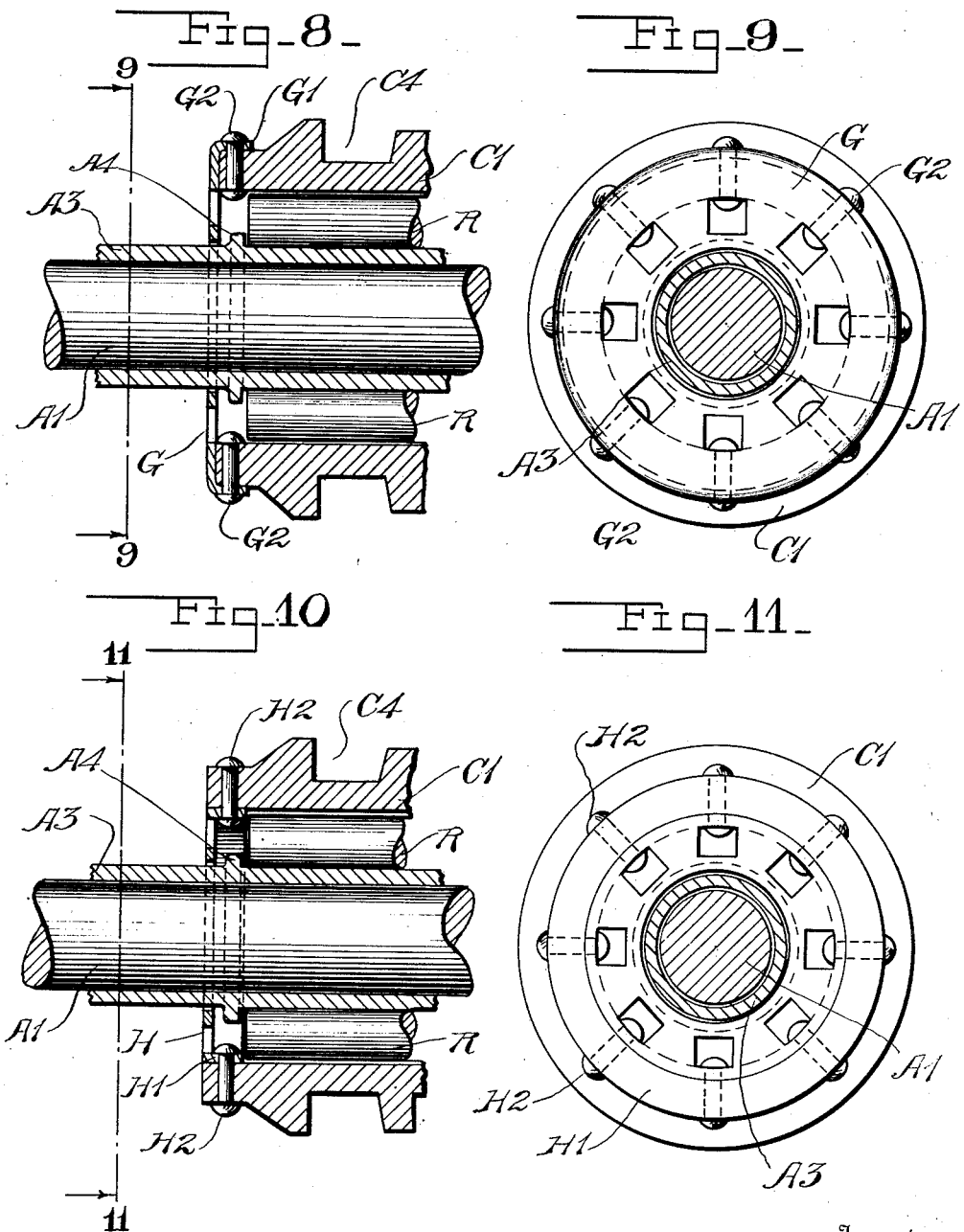

March 6, 1928.
H. W. SANFORD
1,661,968
JOURNAL BOX AND AXLE
Filed Feb. 16, 1924
4 Sheets-Sheet 4
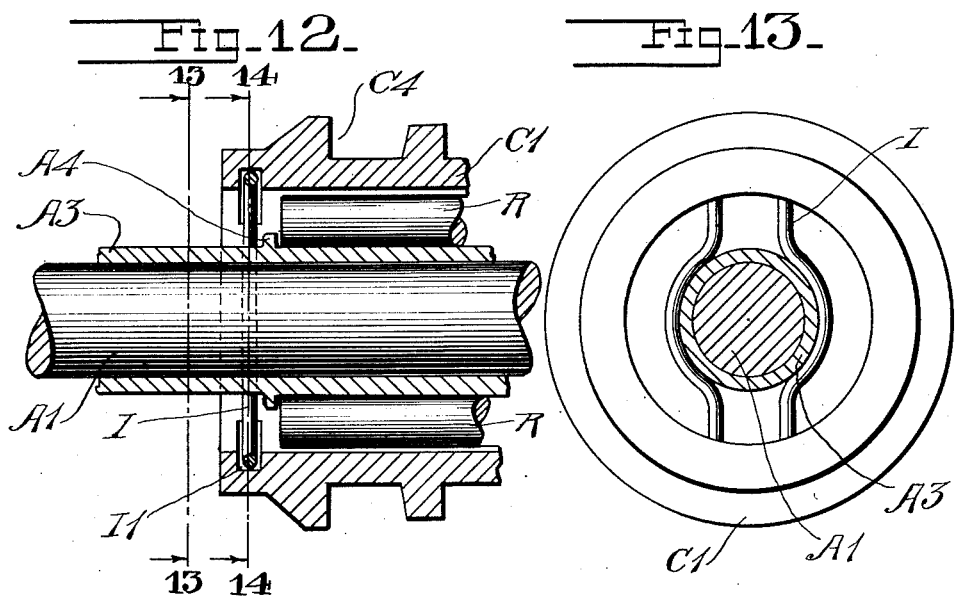
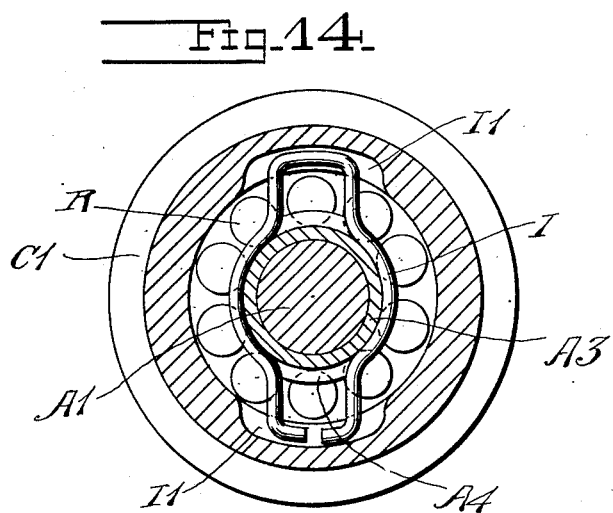
Inventor
Hugh W. Sanford
By Cyrus Kehr
Attorney Patented Mar. 6, 1928.

1,661,968

UNITED STATES PATENT OFFICE.

HUGH W. SANFORD, OF KNOXVILLE, TENNESSEE.

JOURNAL BOX AND AXLE.

Application filed February 16, 1924. Serial No. 693,273.

This improvement relates particularly to the axles, axle boxings, and wheels of mine cars.

One object of the invention is to provide greater strength for a given thickness of axle and to provide a structure which will permit the removal of the wheel from the axle without displacing the anti-friction rollers ordinarily used in such wheels.

A further object of the invention is to provide a construction in which there is greater strength for a given diameter of the journal or axle.

An important feature of the invention is a sleeve which surrounds the part of the journal or axle which rests in the wheel hub and on and around which the anti-friction rollers of the bearing are arranged. Said sleeve is preferably longer than the wheel hub, as will be herein described. A structure comprising a sleeve in a general way like the sleeve of the present application is made the subject matter of my application for Letters Patent of the United States, Serial Number 652,585, filed July 19, 1923, for "journal boxes and axles." In the structure of that application, provision is made for engagement between the extreme outer end of the sleeve and the outer end of the wheel hub to cause the sleeve to be drawn off from the journal or axle when the wheel is removed from the journal or axle. In the construction of this application, provision is made for engagement between the inner end of the wheel hub and the adjacent part of the sleeve, whereby the sleeve is removed from the journal or axle when the wheel is removed.

Such engagement between the inner end of the hub and the sleeve may be made in several ways, as herein described.

In the accompanying drawings:—

Fig. 1 is a longitudinal, upright section in the upright plane extending along the axial line of one of the axles of the car;

Fig. 2 is a transverse, upright section on the line, 2—2, of Fig. 1, looking toward the left;

Fig. 3 is a transverse upright section on the line, 3—3, of Fig. 1, looking toward the right;

Fig. 4 is a view similar to Fig. 1, showing only the rear part of the hub and rollers and the adjacent part of the journal and sleeve, different means being used to make engagement between the hub and the sleeve;

Fig. 5 is an upright section on the line, 5—5, of Fig. 4, looking toward the right;

Fig. 6 is a view similar to Fig. 4, different means being used to make engagement between the hubs and the sleeve;

Fig. 7 is an upright section on the line, 7—7, of Fig. 6, looking toward the right;

Fig. 7$^a$ is a section on the line, 7$^a$—7$^a$, of Fig. 6, looking toward the left;

Fig. 8 is a view similar to Figs. 4 and 5, different means being used for making engagement between the hub and the sleeve;

Fig. 9 is an upright section on the line, 9—9, of Fig. 8, looking toward the right;

Fig. 10 is a view similar to Figs. 4, 6 and 8, different means being used for making engagement between the hub and the sleeve;

Fig. 11 is an upright section on the line, 11—11, of Fig. 10, looking toward the right;

Fig. 12 is a view similar to Figs. 4, 6, 8 and 10, different means being used to make engagement between the hub and the sleeve;

Fig. 13 is an upright section on the line, 13—13, of Fig. 12, looking toward the right;

Fig. 14 is an upright section on the line, 14—14, of Fig. 12, looking toward the right.

Referring first to Figs. 1, 2 and 3 of the drawings, A is the axle, A$^1$ is the journal or the part of the axle which extends through the axle boxing and the wheel.

At the junction of the body of the axle, A, and the journal, A$^1$, is an annular shoulder or rib, A$^2$, which extends outward far enough to engage the adjacent end of the axle boxing, B. A sleeve or tube, A$^3$, extends around the journal, A$^1$, from the annular shoulder, A$^2$, outward to the end of the journal. C is the wheel. This has the hub, C$^1$, which has an end wall, C$^2$, extending across the end of the journal and bearing against said end. Between the sleeve, A$^3$, and the inner face of the hub are anti-friction rollers, R, which bear on said sleeve and on said hub. The outer ends of said rollers reach to the hub end wall, C$^2$. The inner ends of the rollers do not extend all the way to the inner end of the hub, C$^1$. Next to the inner ends of the rollers, an annular rib or flange, A$^4$, is formed on the journal, A$^1$, to constitute an abutment for the inner ends of said rollers, whereby relative movement of the rollers toward the inner end of the sleeve, $A^3$, is prevented. The annular rib or flange, $A^4$, is also used for making engagement between the inner end of the hub and the adjacent part of the sleeve, $A^3$, whereby the sleeve must move outward with the wheel hub when the latter is moved outward for removal from the journal.

The axle boxing, B, is secured to the car bottom (not shown) in any desired manner. The main part of the axle boxing closely surrounds the sleeve, $A^3$, while the outer end of the axle boxing is flared to form a flange, $B^1$, extending around the inner end of the hub, $C^1$, of the wheel, C.

In the part of the hub which is surrounded by the flange, $B^1$, the hub has an external circumferential channel, $C^4$. Above and around the hub a key, D, extends horizontally through the flange, $B^1$, and tangentially through the hub channel, $C^4$, and is retained by a cotter, $D^1$. Said keys prevent the wheel and hub from moving horizontally outward away from the boxing, B.

At the side of the flange, $A^4$, opposite the inner ends of the rollers, two key rods or wires, $C^5$, extend through the hub and bear against the sleeve, $A^3$, near the flange, $A^4$. Each of said keys has at one end a head, $C^6$, which rests against the outer face of the hub, while the other end of the key projects trough the hub and is bent laterally against the outer face of the hub.

When the wheel is to be removed, the keys, D, are first removed, whereby the wheel is disengaged from the boxing, B. Then the wheel may be drawn outward. But the keys, $C^5$, will then engage the sleeve flange, $A^4$, and force the sleeve, $A^3$, to move outward with the wheel, whereby the sleeve retains its position relative to the rollers, R, and keeps the rollers in position in the hub until such time as the wheel and sleeve are to be returned to their working position. When these parts are being so returned, the outer end wall, $C^2$, of the hub will bear against the outer end of the sleeve, $A^3$, and compel said sleeve to move in unison with the hub.

In the forms illustrated by Figs. 4 to 14, inclusive, the construction is the same as already described relative to Figs. 1, 2 and 3, excepting that means other than the keys, $C^5$, for making engagement between the hub and the sleeve, $A^3$, are used.

In the form shown by Figs. 4 and 5, a washer, E, surrounds the sleeve, $A^3$, and is large enough to reach to the inner face of the hub and to fit said sleeve so closely as to avoid passing the sleeve flange, $A^4$. At the side of the washer, opposite the flange, $A^4$, bolts or rivets, $E^1$, extend through the hub, $C^1$, and into the range of the washer, whereby the washer is prevented from moving inward or leftward out of the hub.

It will now be seen that if the wheel and hub are drawn outward for removal from the journal, $A^1$, the bolts or rivets, $E^1$ will carry the washer, E, rightward or outward into engagement with the flange, whereby the sleeve is carried with the hub and caused to remain in the hub and retain the rollers, R, in position.

In Figs. 6 and 7, a cap, F, surrounds the inner end of the hub, and is fitted closely around the sleeve at the side of the flange, $A^4$, opposite the rollers, R. Said cap has a marginal flange, $F^1$, extending over the periphery of the hub adjacent its ends. Parts of the extreme edge of said flange are bent into recesses, $F^2$, formed in the hub, whereby said cap is immovably held in place on the end of the hub. When the hub is moved outward for removal from the journal, $A^1$, the cap, F engages the sleeve flange, $A^4$, and compels movement of the sleeve with the hub.

In Figs. 8 and 9, a cap, G, similar to the cap, F, and having a flange, $G^1$, is applied to the inner end of the hub and around the sleeve as in Figs. 6 and 7; but the recesses, $F^2$, are omitted, and bolts or rivets, $G^2$, are extended through said flange and the adjacent part of the hub radially to the hub axis.

In Figs. 10 and 11, the cap is of the same form as in Figs. 8 and 9, excepting that its diameter is small enough to permit placing the flange, $H^1$, against the inner face of the hub and securing said flange to the hub by bolts or rivets, $H^2$, extending rigidly through the hub and said flange. In both forms shown by Figs. 8, 9, 10 and 11, the cap engages the sleeve flange, $A^4$, and compels movement of the sleeve with the hub when the hub is shifted outward for removal from the journal, $A^1$.

In Figs. 12, 13 and 14, a single key, I, is substituted for the washers above described and for the two keys of Figs. 1, 2 and 3. At opposite sides of the journal, $A^1$, a recess, $I^1$, is formed in the inner face of the hub, $C^1$. Said recesses are in a plane which is transverse to the journal and between the sleeve flange, $A^4$, and the extreme inner end of the hub. The key, I, may be formed by folding a wire or light rod upon itself into approximately the shape of an elongated link adapted to have one end resting in one recess, $I^1$, while its other end rests in the other recess, $I^1$, and the sides of the link are so close to the journal, $A^1$, as to cause engagement between the link and the sleeve flange, $A^4$, when the hub is shifted outward for the removal of the wheel from the journal, $A^1$, whereby the sleeve is compelled to remain in position in the hub and retain the rollers, R, in position.

On examining the function of the sleeve, $A^3$, it will be seen that said sleeve may be regarded as closely associated with or as forming a part of the wheel or wheel hub. When the keys, D, have been removed, the hub is free for removal from the journal, and the engagement made between the sleeve and the hub at the inner end of the hub by utilizing the sleeve flange, A⁴, the sleeve is carried outward in unison with the hub and the rollers, R, whereby, as already pointed out, the rollers are kept in position. Combining the sleeve in this manner with the wheel and rollers makes the wheel self-contained or adapted to remain assembled when removed from the journal. In view of this relationship between the hub and the sleeve, A³, that sleeve may be regarded as an inner hub lining.

In addition to serving to retain the rollers, the sleeve will also serve as a replaceable wearing member. When it becomes worn, it may be removed and a new sleeve substituted.

A further advantage of this construction is the added strength given to the structure for a given journal diameter. The part of the sleeve reaching through the axle boxing is virtually an extension of the wheel and avoids or reduces the localizing of transverse journal strains at the inner end of the hub. The sleeve serves to distribute such strains. Furthermore, this form of the sleeve permits its easy manufacture of high carbon steel tubing which will give greater strength than could be had from an equal cross section of the ordinary machine steel from which axles of this form are made. Thus an axle boxing of a given interior diameter may be a part of such a structure having greater strength than can be had without the use of the sleeve.

I claim as my invention,

1. The combination of a journal, a hub having a fixed outer end wall extending across the outer ends of the below-mentioned rollers, a sleeve surrounding the journal within the hub, means independent of the sleeve for holding the hub on the journal, rollers between the sleeve and the hub, and means at the inner end of the hub for making engagement between the hub and the sleeve for the removal of the sleeve from the journal with the hub, substantially as described.

2. The combination of a journal, a hub having a fixed outer end wall extending across the outer end of the journal, a sleeve surrounding the journal within the hub, means independent of the sleeve for holding the hub on the journal, rollers between the sleeve and the hub, and means at the inner end of the hub for making engagement between the hub and the sleeve for the removal of the sleeve from the journal with the hub, substantially as described.

3. The combination of a journal, a hub having a fixed outer end wall extending across the outer ends of the below-mentioned rollers, a sleeve surrounding the journal within the hub and having a lateral extension at the inner end of the hub, means independent of the sleeve for holding the hub on the journal, rollers between the sleeve and the hub, and a member at the inner end of the hub for making engagement between the hub and the sleeve for the removal of the sleeve from the journal with the hub, substantially as described.

4. The combination of a journal, a hub having a fixed outer end wall extending across the outer ends of the below-mentioned rollers, a sleeve surrounding the journal within the hub and having a lateral extension at the inner end of the hub, means independent of the sleeve for holding the hub on the journal, rollers between the sleeve and the hub, and a key member at the inner end of the hub for making engagement between the hub and said lateral extension for the removal of the sleeve from the journal with the hub, substantially as described.

5. The combination of a journal, a hub having a fixed outer end wall extending across the outer ends of the below-mentioned rollers, a sleeve surrounding the journal within the hub and having an outward extension adjacent the outer end of the hub, means independent of the sleeve for holding the hub on the journal, rollers between the sleeve and the hub, and removable means for making engagement between the inner end of the hub and said outward extension for removal of the sleeve from the journal with the hub, substantially as described.

6. The combination of a journal, a hub having a fixed outer end wall extending across the outer ends of the below-mentioned rollers, means independent of the sleeve for holding the hub on the journal, a sleeve surrounding the journal within the hub and formed for engaging the inner ends of said rollers, rollers between the sleeve and the hub, and means at the inner end of the hub for making engagement between the hub and the sleeve for the removal of the sleeve from the journal with the hub, substantially as described.

In testimony whereof I have signed my name, this 14th day of February, in the year one thousand nine hundred and twenty-four.

HUGH W. SANFORD.